United States Patent [19]

Tamura et al.

[11] Patent Number: 4,852,184
[45] Date of Patent: Jul. 25, 1989

[54] METHOD AND SYSTEM FOR SPECTACLES FRAME IMAGE PROCESSING AND RECORDING

[75] Inventors: Masafumi Tamura; Ken-ichi Ichikawa, both of Tokyo; Satoshi Kageyama, Yokohama, all of Japan

[73] Assignees: Kabushiki Kaisha Toshiba, Kawasaki; Tokyo Kogaku Kikai Kabushiki Kaisha, Tokyo, both of Japan

[21] Appl. No.: 112,953

[22] Filed: Oct. 27, 1987

[30] Foreign Application Priority Data

Oct. 30, 1986 [JP] Japan .................................. 61-257023
Oct. 30, 1986 [JP] Japan .................................. 61-257024
Oct. 30, 1986 [JP] Japan .................................. 61-257025
Oct. 30, 1986 [JP] Japan .................................. 61-257026
Oct. 30, 1986 [JP] Japan .................................. 61-257027

[51] Int. Cl.⁴ .......................................... G06F 15/62
[52] U.S. Cl. .......................................... 382/48; 382/1; 358/93
[58] Field of Search ................... 382/1, 48; 340/705, 340/723, 725, 747; 358/93

[56] References Cited

U.S. PATENT DOCUMENTS 4,730,260  3/1988  Mori et al. ............................. 358/93
9,539,585  9/1985  Spackora et al. ..................... 358/93

Primary Examiner—Thomas H. Tarcza
Assistant Examiner—Ian J. Lobo
Attorney, Agent, or Firm—Oblon, Spivak, McClelland, Maier & Neustadt

[57] ABSTRACT

A spectacles frame image picked up by a TV camera is displayed on a TV monitor, and pattern data representing a frame and its image data are recorded in a spectacles frame data-base by setting an image region to be cut out using a cursor. At this time, a process for removing an enhancement region and a digitized process for obtaining pattern data are performed by a processor. After a spectacles frame data-base is created, in the processor an image of a human face and the frame image can be synthesized by edge processing and color mixing processing.

22 Claims, 22 Drawing Sheets

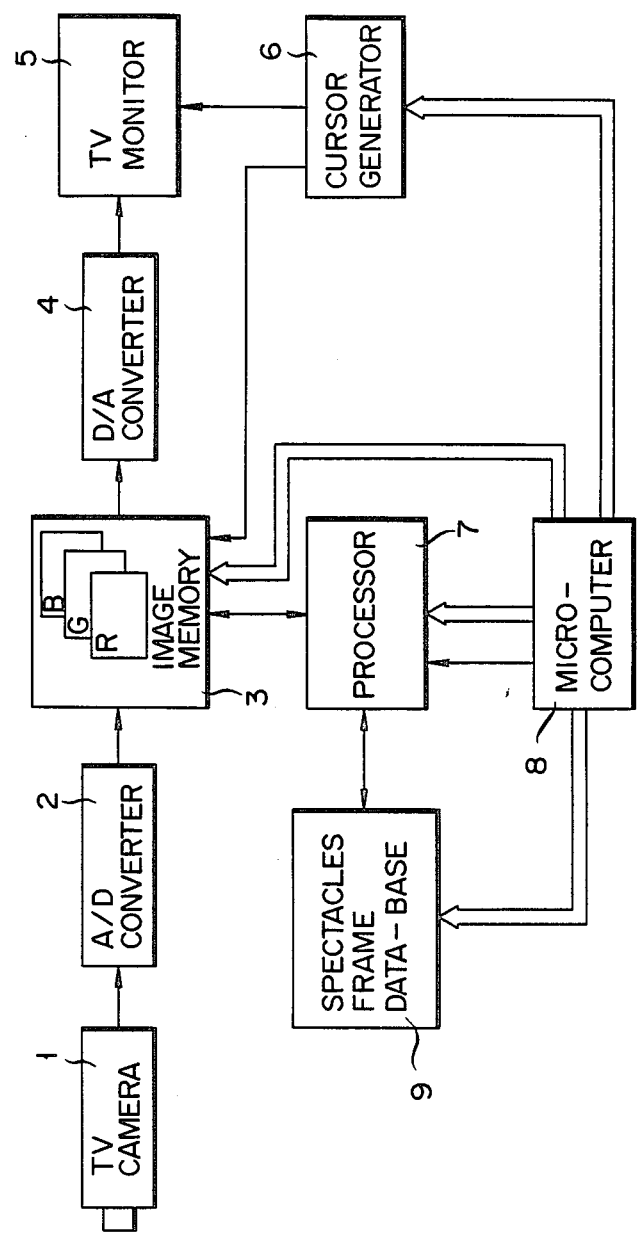
F I G. 1

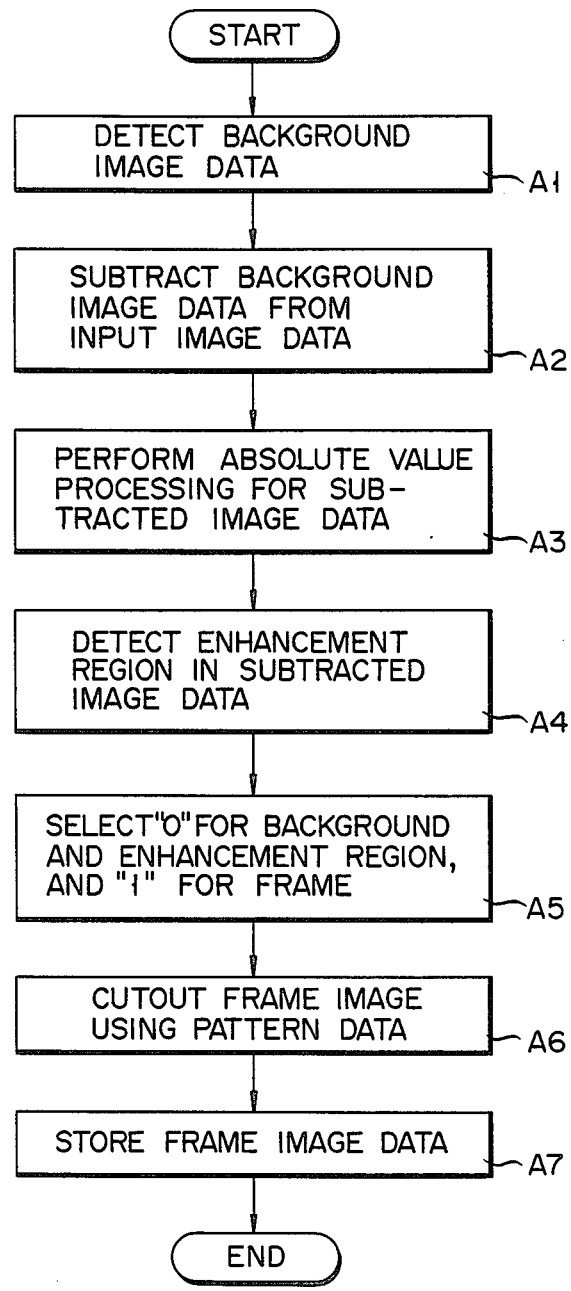
F I G. 7

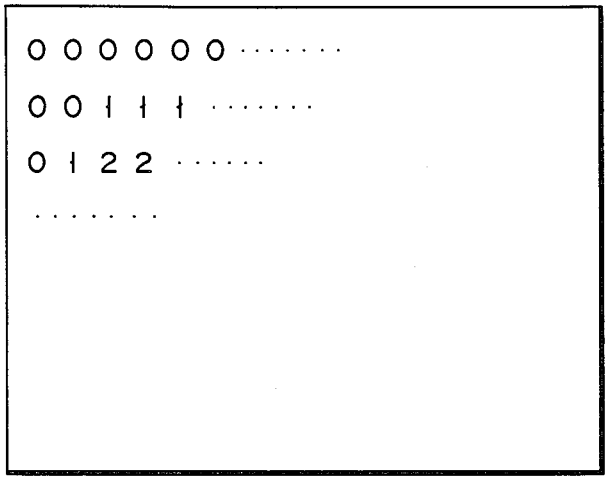
F I G. 12A
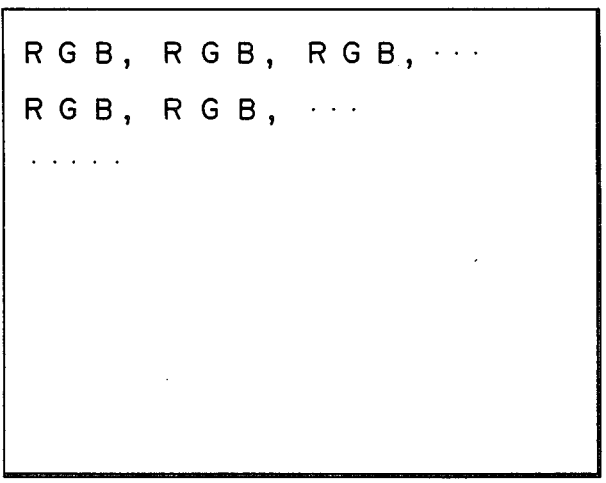
F I G. 12B

```
WORKING MENU OF SPECTACLES
FRAME
    1   UTILITY
    2   REGISTER FRAME
    3   CHANGE FRAME NUMBER
    4   DELETE FRAME
    5   EDIT FRAME
```

FIG. 13A

```
    UTILITY MENU

1   INITIALIZE FDD
2   DISPLAY REGISTER NUMBER
3   DISPLAY FRAME
0   END
```

FIG. 13B

```
0070 0071 0072 0073 0074 0075 0076 0077
0078 0079 0080 0081 0082 0083 0084 0085
0086 0087 0088 0089 0090 0091 0092 0093
0100 0101 0102 0103 0104 0105 0106 0107
0108 0109 0110 0111 0112 0113 0114 0115
    APPARATUS NUMBER (1/2) : 2
    THE NUMBER OF FRAME  : 65
*  DISPLAY NEXT LINE BY  SCROLLING
   WITH (MOVEMENT) KEY
```
F I G. 13C
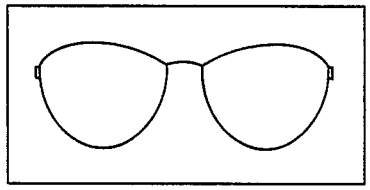
```
APPARATUS NUMBER (1/2) : 2
FRAME NUMBER           : 73
*  PLEASE INPUT FRAME NUMBER
```
F I G. 13D

```
CHANGE FRAME NUMBER
```

FRAME NUMBER : 200
   NEW FRAME NUMBER : 300

*  PLEASE PUSH (OPERATION/
   REGISTRATION) KEY AFTER
   CONFIRMING FRAME NUMBER

FIG. 13E

```
DELETE FRAME
```

FRAME NUMBER : 200

*  PLEASE PUSH (OPERATION/
   REGISTRATION) KEY AFTER
   CONFIRMING FRAME NUMBER

FIG. 13F

```
    EDITING MENU OF FRAME
1   BACK UP
2   COPY
3   CONTINUOUS COPY
4   COPY WITH FRAME NUMBER
    CHANGED
0   END
```

F I G. 13G

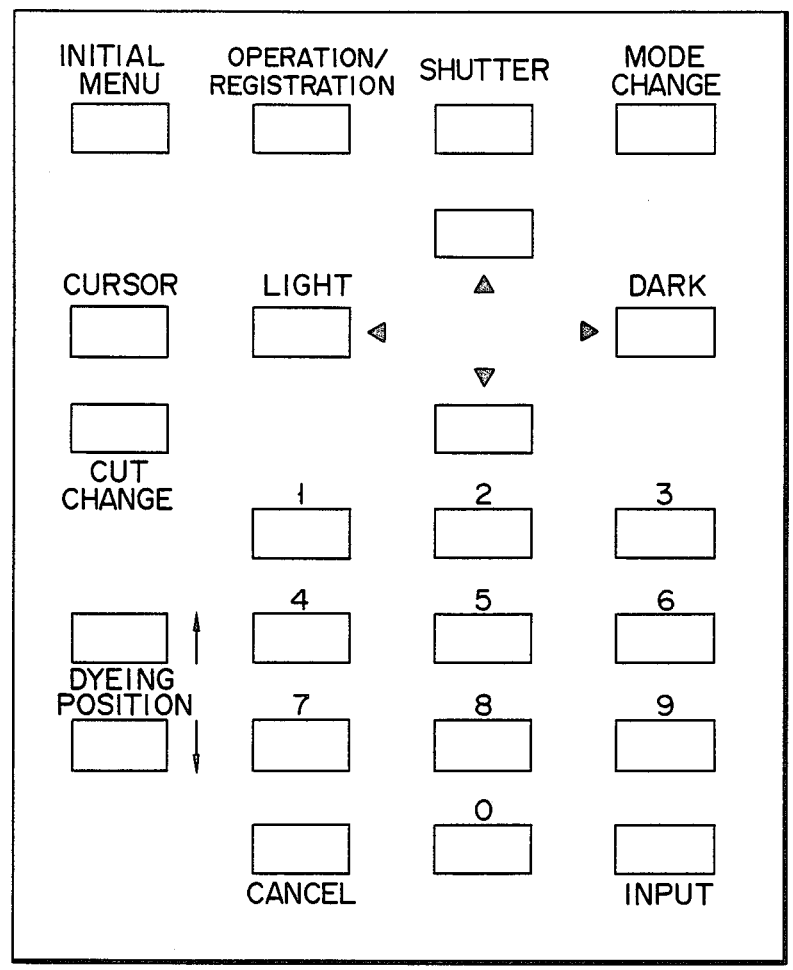
F I G. 14

$*\ Z=(n/4)X+(1-n/4)Y$

```
0 0 0 1
0 0 1 1 2 2
0 0 1 1 2 2 2 2
0 0 1 1 2 2 2 2 2
0 0 1 1 2 2 2 2 2 2
0 0 1 1 2 2 2 2 2 2 2
0 0 1 1 2 2 2 2 2 2 2
0 0 1 1 2 2 2 2 2 2 2
0 0 1 1 2 2 2 2 2 2 2
0 0 1 1 2 2 2 2 2 2 2
0 0 1 1 2 2 2 2 2 2 2
0 0 0 1 1 2 2 2 2 2
0 0 0 0 1 1 1 1 1 1 1
0 0 0 0 0 1 1 1 1 1 1
0 0 0 0 0 0 0 0 1 1 0
0 0 0 0 0 0 0 0 0 0 0
```

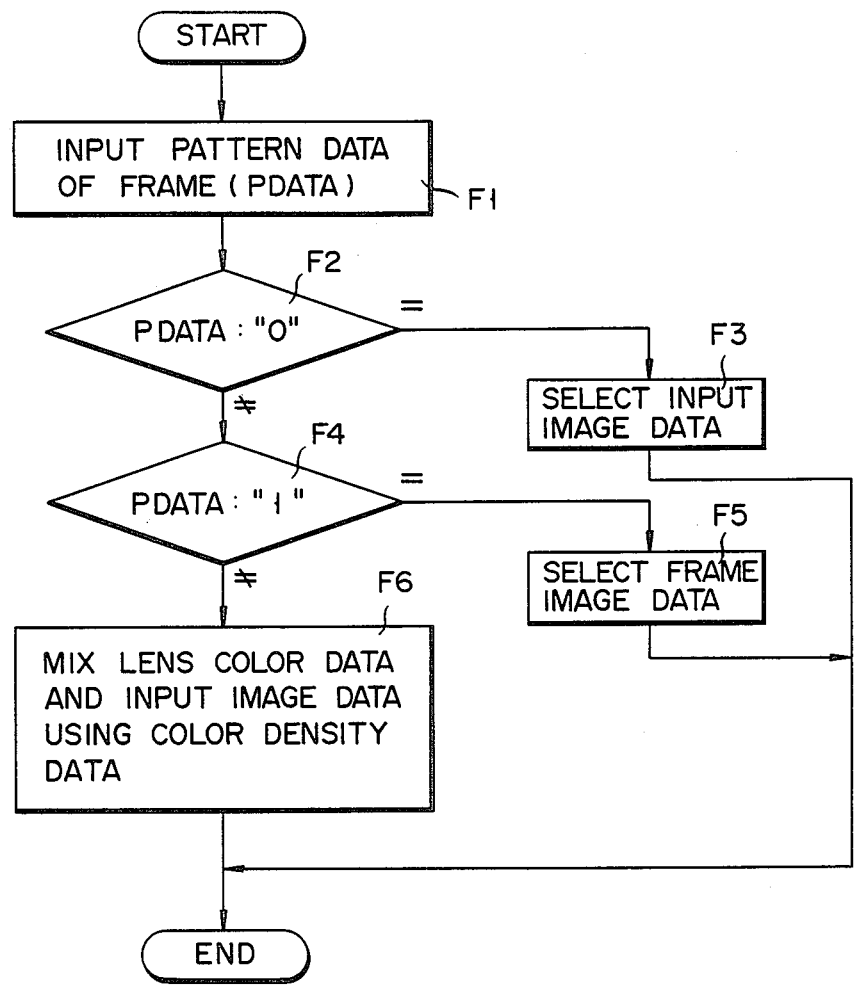
F I G. 20

METHOD AND SYSTEM FOR SPECTACLES FRAME IMAGE PROCESSING AND RECORDING

BACKGROUND OF THE INVENTION

The present invention relates to a method and a system for spectacles frame image processing and recording for creating a data-base of a spectacles frame by cutting out an image of only a spectacles frame with high accuracy so as to synthesize an image of a human face and a frame image.

In a recently developed method, a variety of spectacles frame images are recorded and selectively synthesized with an image of a face, which is input through a television (to be referred to as TV hereinafter) camera, of a person who wants to select a spectacles frame. The user selects a spectacles frame while monitoring a synthetic image. In order to select a spectacles frame in this way, images of various spectacles frames must be recorded as a data-base. Therefore, only data of a frame portion is extracted from an input spectacles frame image, and the frame portion is cut out from the spectacles frame image in accordance with the data.

Conventionally, a spectacles frame image to be recorded is input through a TV camera or the like, a necessary portion, e.g., a predetermined rectangular region in which the spectacles frame image is placed is cut out using a cursor while displaying the spectacles frame image on a TV monitor, and image data of this portion is recorded. In this case, since an input image signal has various characteristics, an image signal of a background is not always constant, or an image signal of a spectacles frame is not always constant. Even if the image signal of the background is constant, edge enhancement inherent in a TV signal, i.e., enhancement processing is performed to a boundary between the background and the spectacles frame. For this reason, it is difficult to cut out a necessary image portion from the input image with high accuracy, and an edge of a cutout image portion sometimes becomes unnatural.

In addition, conventionally, in order to create a database of a spectacles frame image, image data in a region including a spectacles frame are all cut out and recorded. However, of the spectacles frame image, the amount of image data of a frame itself is very small, and most of the remaining portion is background image data. For this reason, frame data must be effectively cut out to reduce an data amount of a portion including the spectacles frame, thereby recording a large number of spectacles frame data in a recording medium.

Moreover, when a spectacles frame image is to be synthesized with an image of a human face, a boundary of a synthetic image tends to become unnatural. That is, an image signal is generally represented by an NTSA (National Television System Committee) signal. Therefore, if a difference between colors or brightnesses of both the images is large, jaggy is produced in the boundary therebetween. In addition, when color lenses are used with a spectacles frame, it is practically difficult to confirm whether the spectacles frame fits a user's face.

Therefore, a demand has arisen for a method and a system for spectacles frame image processing and recording capable of cutting out only a necessary image portion and synthesizing a cutout image and another image without unnaturalness.

SUMMARY OF THE INVENTION

It is an object of the present invention to provide a method and a system for spectacles frame image processing and recording for creating a data-base of a spectacles frame by cutting out image data of only a spectacles frame with high accuracy so as to synthesize an image of a human face and a frame image.

According to an aspect of the present invention, there is provided a method for spectacles frame image processing and recording comprising the steps of:

imaging a spectacles frame using a television camera;

recording image data of the spectacles frame obtained by imaging in an image memory;

displaying the spectacles frame image data recorded in the image memory on a television monitor;

setting an image cutout region by displaying a cursor on a spectacles frame image displayed on the television monitor;

cutting out an image of only a frame from the image cutout region set by the cursor;

obtaining pattern data of the frame to digitile the cutout image of only the frame using a preset threshold value; and recording the pattern data and the image data of the spectacles frame by obtaining image data of the frame using the frame pattern data.

According to another aspect of the present invention, there is provided a system for spectacles frame image processing and recording comprising:

means for imaging a spectacles frame using a television camera;

means for recording image data of the spectacles frame obtained by imaging in an image memory;

means for displaying the spectacles frame image data recorded in the image memory on a television monitor;

means for setting an image cutout region by displaying a cursor on a spectacles frame image displayed on the television monitor;

means for cutting out an image of only a frame from the image cutout region set by the cursor;

means for obtaining pattern data of the frame to digitize the cutout image of only the frame using a preset threshold value; and means for recording the pattern data and the image data of the spectacles frame by obtaining image data of the frame using the frame pattern data.

BRIEF DESCRIPTION OF THE DRAWINGS

FIG. 1 is a block diagram of an arrangement of a system for spectacles frame image processing and recording according to the present invention;

FIG. 7 is a flow chart for an operation of enhancement processing;

FIGS. 12A and 12B are schematic views of pattern data and image data of a frame recorded in a spectacles frame data-base, respectively;

FIGS. 13A to 13G are schematic views for registration of spectacles frame data;

FIG. 14 is a front view of an arrangement of a key pad for selecting a spectacles frame;

FIG. 20 is a flow chart for an operation of the mixing processing of colors between images to be synthesized;

DETAILED DESCRIPTION OF THE PREFERRED EMBODIMENT

Figure 2:
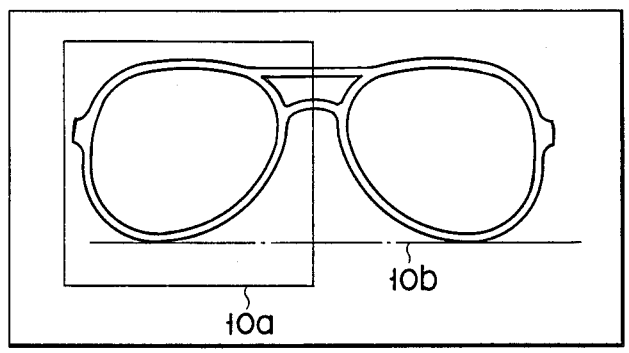
FIG. 2 is a view of a cutout region of a spectacles frame image.

An embodiment of the present invention will be described below with reference to the accompanying drawings.

FIG. 1 is a block diagram of an arrangement of a system for spectacles frame image processing and recording according to the present invention. In FIG. 1, a spectacles frame to be recorded is picked up and input by TV camera 1, converted into a digital signal by analog/digital (to be referred to as A/D hereinafter) converter 2, and then recorded in image memory 3. According to this image pickup/input system, an input spectacles frame image signal can be obtained as R, G, and B signals each consisting of 8 bits. Therefore, these R, G, and B signals are respectively stored in image memory 3. Note that the spectacles frame image signal may be divided into NTSC signal components.

The spectacles frame image recorded in image memory 3 is converted into an analog signal by digital-/analog (to be referred to as D/A hereinafter) converter 4 and then input to TV monitor 5 to be displayed as a color image.

Zooming or setting an image pickup region with TV camera 1 is adjusted while observing the spectacles frame image displayed on TV monitor 5. Cursor generator 6 which is operated under the control of microcomputer 8 displays, e.g., rectangular cursor 10a on TV monitor 5 as shown in FIG. 2. By controlling cursor 10a displayed on TV monitor 5, a cutout region of the image is set. Note that in FIG. 2, linear cursor 10b functions to confirm horizontality of the spectacles frame image.

By this adjustment, the spectacles frame image can be obtained with a desired size, and a predetermined rectangular region including the spectacles frame image is cut out. A cutout spectacles frame image is digitized by processor 7, and a frame portion is detected. A detection result is recorded as pattern data of the spectacles frame in spectacles frame data-base 9. Image data of the frame portion obtained using the pattern data is also recorded in data-base 9.

Assume that image processing is to be performed to only half of the spectacles frame. In this case, processor 7 reads out image data of the rectangular region from image memory 3 and performs image processing. Thus, by cutting out the spectacles frame image corresponding to half of the spectacles frame, the image processing time can be reduced to half.

Background image data is cut out on the basis of the following conditions:

(1) When a spectacles frame is to be photographed the spectacles frame is set in front of a predetermined backscreen so as to obtain substantially uniform background image data.

Figure 3:
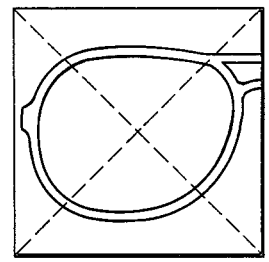
FIG. 3 is view of a cutout half of the spectacles frame image.

(2) A spectacles frame holds lenses therein. Therefore, when only half of the spectacles frame is cut out as shown in FIG. 3, a central portion of a rectangular region can be specified as a portion in which a lens is fitted, that is, as a background with respect to the frame. If the central portion of the rectangular region is specified as the background as described above, image data of the background can be cut out regardless of a shape and a size of the spectacles frame or regardless of positional deviation to some extent.

Note that processor 7 performs a variety of image processing to create data-base 9. Sequences of the respective processing will be described below with reference to block diagrams and flow charts.

(Removal of Enhancement Region)

Figure 4:
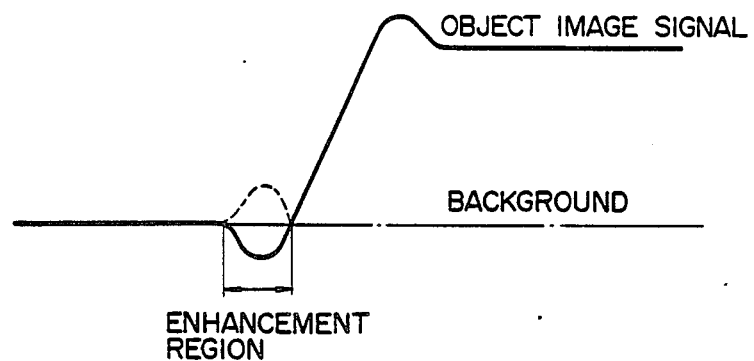
FIG. 4 is a view of a signal of an enhancement region in the spectacles frame image.
Figure 5:
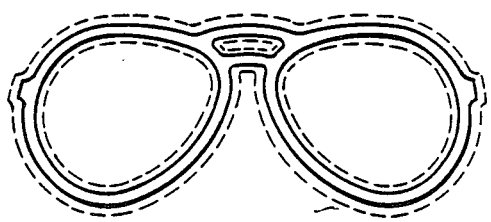
FIG. 5 is a view of an edge portion obtained by signal components of the enhancement region in the spectacles frame image.

A spectacles frame image which is picked up and input by the TV camera is performed with enhancement processing so as to clarify a boundary between a background and a frame. For example, when a bright spectacles frame is imaged under a dark background, a brightness signal having brightness lower than that of background is produced at the boundary as shown in FIG. 4. When the spectacles frame in the background is to be simply displayed, a signal of such an enhancement region is convenient since the image is clarified upon edge enhancement. However, when an image signal with the background is cut out to obtain a spectacles frame, a signal of such an enhancement region remains together with the signal of the spectacles frame. Therefore, as indicated by dotted lines in FIG. 5, peripheries corresponding to an image of the enhancement region appear around an original image of the spectacles frame. For this reason, the enhancement region must be removed.

Figure 6:
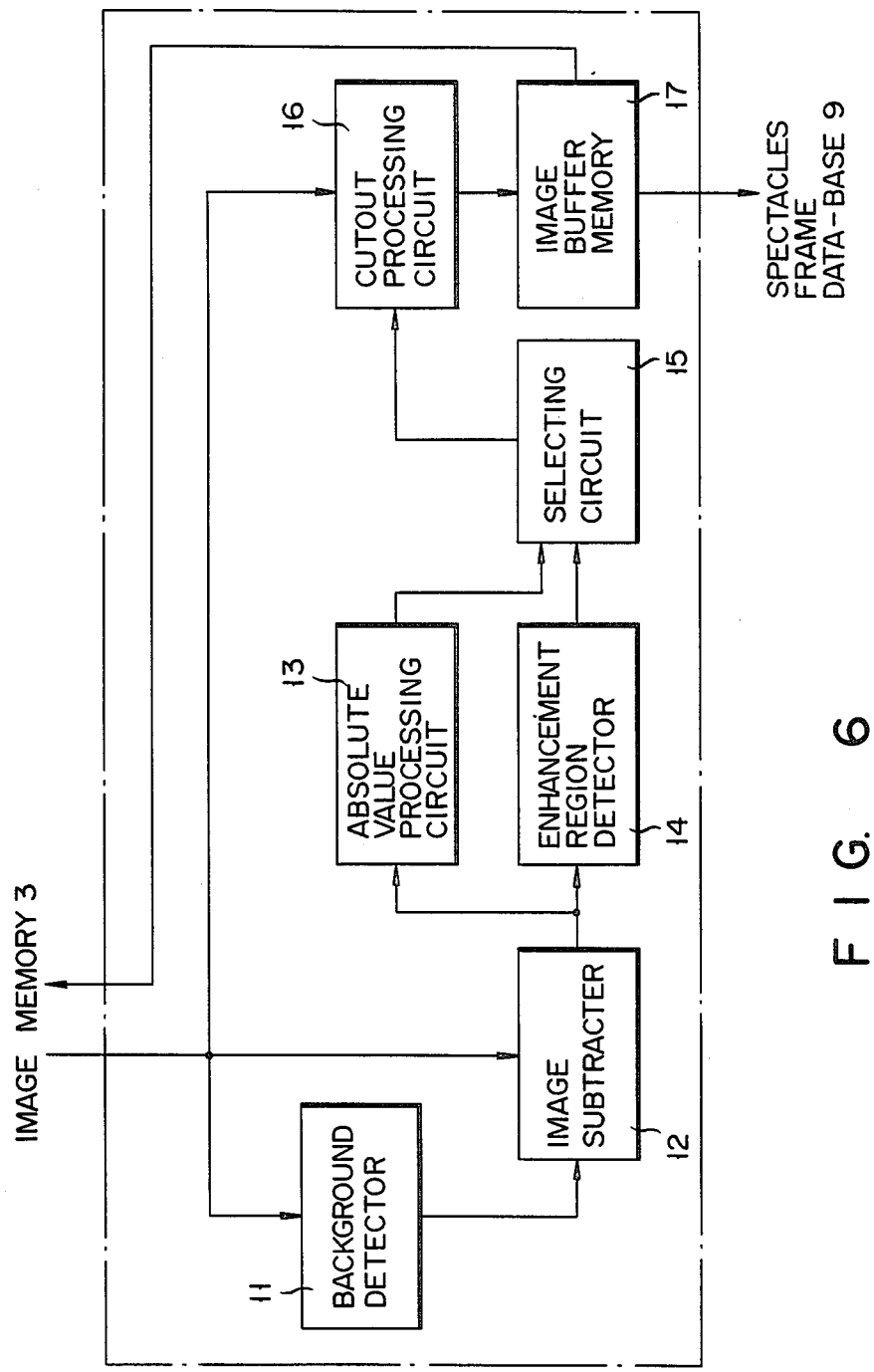
FIG. 6 is a block diagram of an arrangement of a circuit which performs enhancement processing.

FIG. 6 shows a block diagram of a circuit for removing the enhancement region in a case wherein a necessary image is to be cut out from an input image, and FIG. 7 is a flow chart for an operation of the processing.

In step A1 of FIG. 7, only background image data is detected from input image data by background detector 11. In step A2, image subtracter 12 subtracts the background image data from the input image data, thereby cutting out image data of only a spectacles frame portion. However, a subtracted frame image includes a signal of an enhancement region. Therefore, the enhancement region must be removed. In step A3, absolute value processing circuit 13 performs absolute value processing for the image data obtained in step A2. By this absolute value processing, the signal of the enhancement region is generated as a signal component having a given brightness as indicated by the dotted line in FIG. 4.

In step A4, enhancement region detector 14 detects the enhancement region in accordance with a polarity of the subtracted image data. More specifically, in accordance with a relationship between brightnesses of the background and the frame, image data representing the frame with respect to the background exhibits a certain polarity on the basis of the background. Therefore, a portion having an opposite polarity of the image data is detected as the enhancement region.

In step A5, in accordance with the enhancement region obtained in step A4, a background data "0" in the enhancement region is selected by selecting circuit 15. Therefore, the signal of the enhancement region is replaced with the same data as that of the background. On the basis of the subtracted image data subjected to the above processing, pattern data having "0" for the background including the enhancement region and "1" for the spectacles frame is selected.

In accordance with the frame pattern data obtained in step A5, only spectacles frame image data is cut out by cutout processing circuit 16 (step A6) and stored in image buffer memory 17 (step A7).

By performing the above processing, the signal of the enhancement region can be removed.

(Cutout, Recording, and Reproducing of Spectacles frame Image)

A method has been developed in which an image of a spectacles frame is selectively synthesized with an image of a face, which is picked up and input by a TV camera, of a person who wants to select a spectacles frame, thereby selecting a spectacles frame while monitoring a synthetic image. In order to carry out the above method, a variety of spectacles frame images must be recorded as a data-base. Especially when a large amount of frame images are to be recorded, a frame image must be effectively cut out to reduce a data amount of an individual frame.

Figure 8:
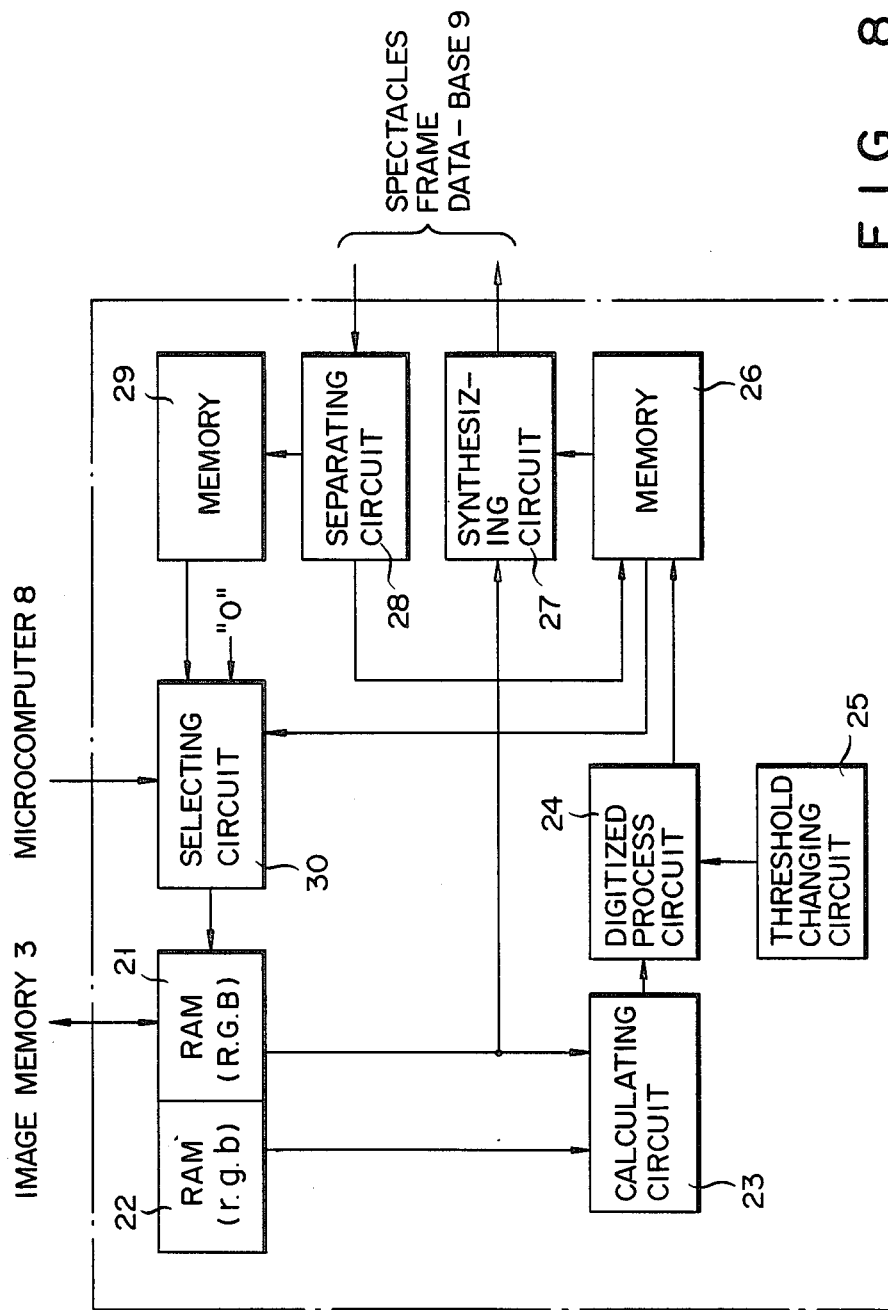
FIG. 8 is a block diagram of an arrangement of a processor which performs cutout, recording, and reproducing processing of a frame image.
Figure 9A:
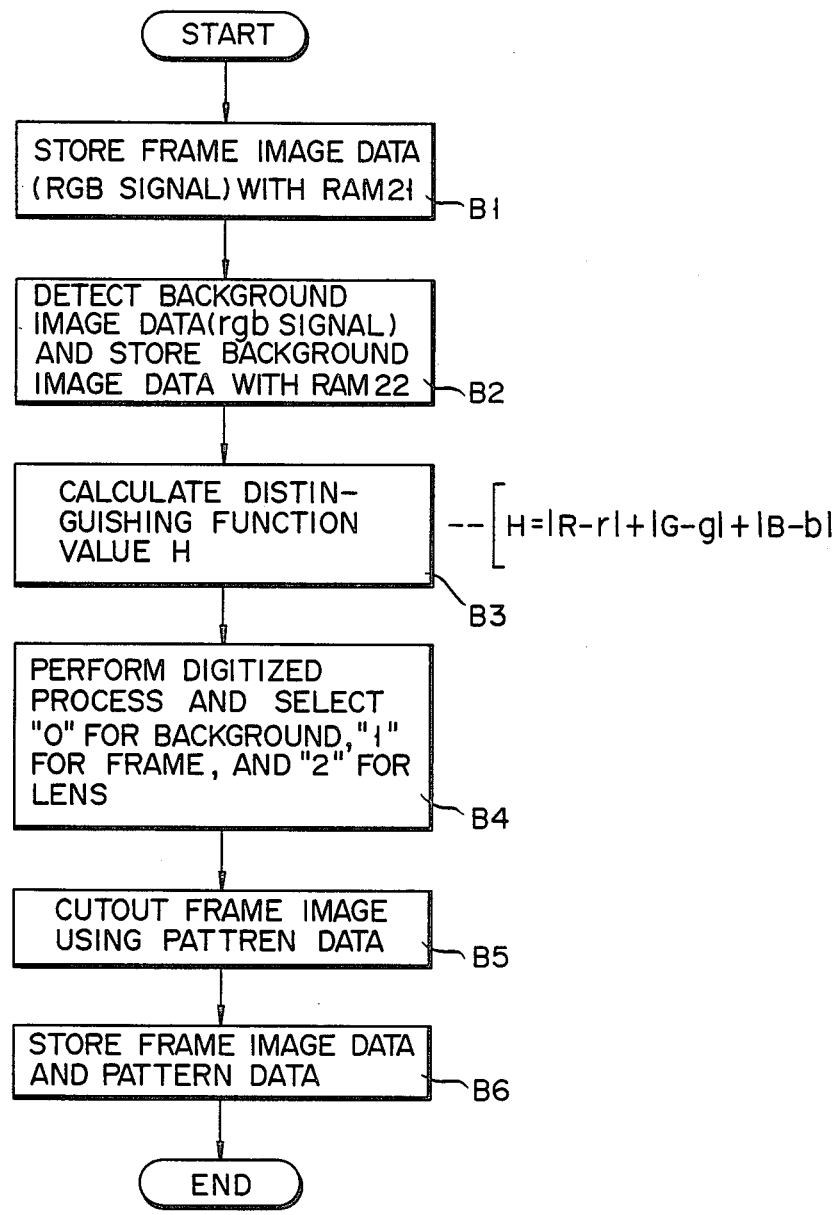
FIGS. 9A and 9B are flow charts for cutout and recording processing of a frame image and reproducing processing thereof, respectively.
Figure 9B:
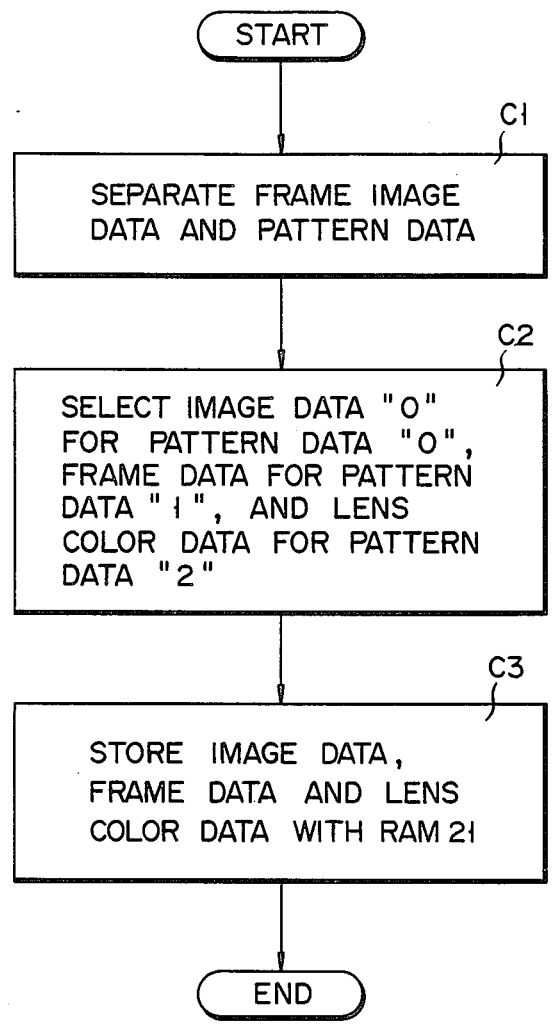

FIG. 8 is a block diagram of an arrangement of a circuit for cutting out, recording, and reproducing spectacles frame image data, and FIGS. 9A and 9B are flow charts for operations of these processing steps. In step B1 of FIG. 9A, frame image data (RGB signals) is stored in RAM 21. Image data (rgb) at the central portion of the rectangular region is cut out as background image data from the frame image data (RGB signals) stored in RAM 21 as shown in FIG. 3 and is stored in RAM 22 (step B2).

In step B3, the cutout frame image data (RGB signals) of the rectangular region and the image data (rgb signals) only of the background are sequentially scanned and read out, and calculating circuit 23 performs calculation between the signals in accordance with the following equation:

$$H = |R-r| + |G-g| + |B-b| \quad (1)$$

where H is a distinguishing function value of a spectacles frame. If the frame image data read out from image memory 3 is of a frame portion, value H of at least one of three pairs of (R,r), (G,g), and (B,b) largely differs from those of the other pairs. Therefore, value H has some value. On the contrary, if the image data read out from image memory 3 is of the background portion, values H of the respective pairs of (R,r), (G,g), and (B,b) are substantially equal to each other. Therefore, value H is 0 or a value close to 0.

Such value H is subjected to digitized process in digitized process circuit 24 using a threshold value set in threshold changing circuit 25 (step B4). As a result "1" is selected for the frame, "0" is selected for the background, and these pattern data of the spectacles frame is stored in memory 26. Synthesizing circuit 27 cuts out frame image data using the obtained pattern data of the frame (step B5). The pattern data and the image data of the frame are recorded in data-base 9 (step B6).

In this case, labeling is performed with respect to the pattern data such that "2" is selected for a lens which is an internal region of the frame represented by "1".

More specifically, as shown in FIG. 3, the central position of the rectangular region can be specifies as a lens portion located inside the spectacles frame. Therefore, labeling is performed such that pattern data "2" is selected for pixel data at the central position. Then, scanning is started from the central coordinate position to the left or right. If data of a point of interest is "0", "2" is selected for this pixel data. This processing is repeated until pattern data "1" which represents the frame is detected. When the frame is detected, the point of interest is returned to the central coordinate position, and scanning is similarly performed in the opposite direction. Thus, processing of one scanning line is completed, and similar processing is executed by sequentially changing a scanning line.

However, according to the type of a spectacles frame, the frame may be thin, or a color of the frame may resemble a background color. In this case, part of the frame is sometimes not detected as the frame represented by pattern data "1" by the above digitized process. That is, pixel lacking may be produced in data "1" representing the frame in the pattern data. When such lacking is present in the pattern data of the frame and labeling is performed by scanning from the central coordinate position to the peripheral portion as described above, the frame represented by data "1" is not detected. Therefore, scanning reaches an edge of the rectangular region from which the spectacles frame image is cut out, and undesirable labeling is performed For this reason, lacking pixels of the frames are detected on the basis of such a labeling result, and at the same time, the number of lacking pixels is counted. If the number of lacking pixels is larger than a predetermined value, a threshold value is changed and the threshold value processing with respect to value H is performed again. The threshold value is changed by sequentially reducing the value. Thus, the frame is processed with respect to the pattern data.

Figure 10A:
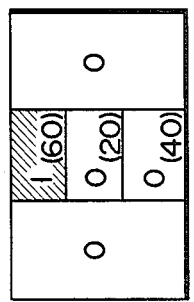
FIGS. 10A to 10C are schematic views of digitized process.

Image data of a spectacles frame is not always uniform throughout all frame portion but is often nonuniform in general. When such image data of the spectacles frame is digitized by a predetermined threshold value, the spectacles frame is detected is either a frame (pattern data "1") or a background (pattern data "0"). That is, as shown in FIG. 10A. when a threshold value is set at "50" and digitized process is performed, pixels of level "60" which form the frame can be detected as pattern data "1", but pixels of levels "40" and "20" which form the same frame are detected as pattern data "0". As a result, if recognition processing of the frame is performed by the labeling, pixel lacking in the frame is detected, and at the same time, the number of lacking pixels is obtained.

On the basis of such a recognition result, the threshold value is changed from "50" to "30", and the digitized processing is repeatedly performed for value H using the changed threshold value.

Figure 10B:
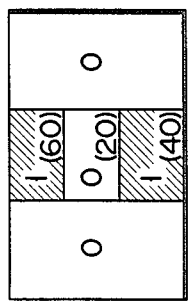
Figure 10C:
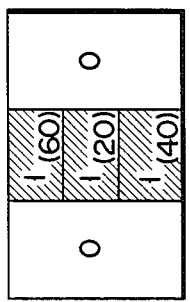

As a result, pixels of levels "60" and "40" which form the frame as shown in FIG. 10B are detected as pattern data "1", i.e., as the frame. However, even if the threshold value is changed, pixels of level "2" which form the same frame are detected as pattern data "0". Therefore, a portion of pixel lacking of the frame and the number of lacking pixels are obtained by the recognition processing of the pattern data. In accordance with a recognition result, the above processing is repeatedly performed by changing the threshold value to "10". By the digitized process using the threshold value of "10", pixels of levels "60", "40", and "2" which form the frame as shown in FIG. 10C are detected as pattern data "1".

Figure 11:
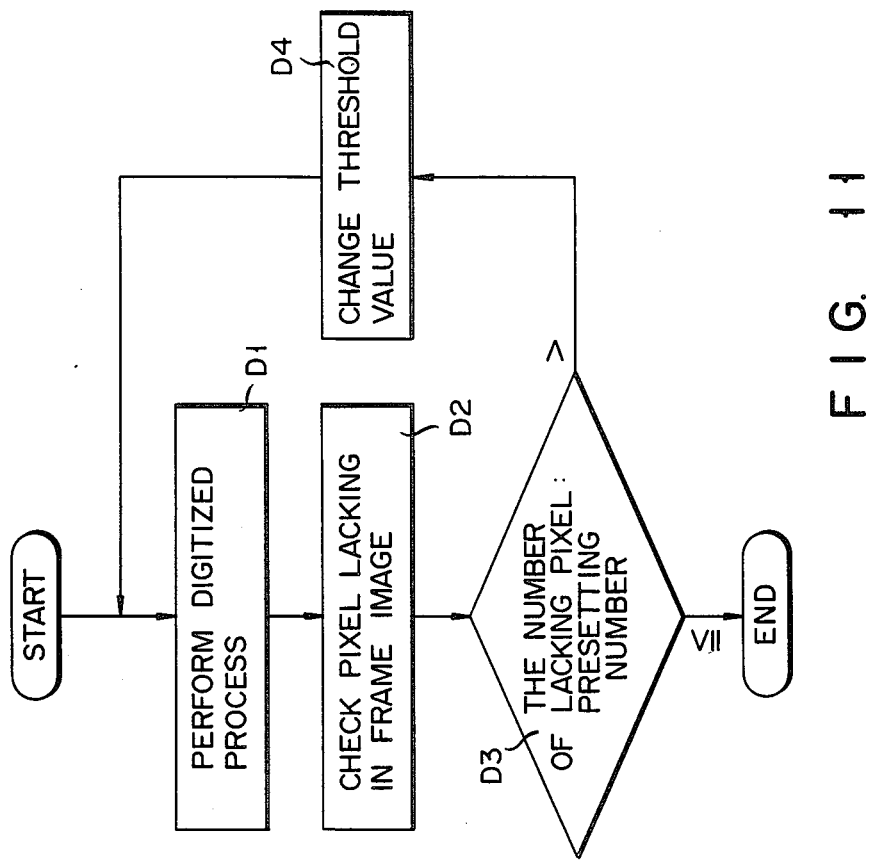
FIG. 11 is a flow chart for an operation of digitized process performed by changing a threshold value.

FIG. 11 is a flow chart for a sequence of the digitized process as described above.

In step D1 of FIG. 11, the digitized process is performed for the frame image such that the background is detected as pattern data "0", the frame is detected as pattern data "1", and the lens is detected as pattern data "2". In step D2, pixel lacking in the frame image and the number of lacking pixels are checked.

In step D3, the number of lacking pixels in the frame image is compared with a presetting number. If the number of lacking pixels in the frame is larger than the presetting number, the threshold value is changed (step D4), and the processing from steps D1 to D3 is performed. Otherwise, the processing is completed By the above processing, the frame can be detected without producing pixel lacking.

At this time, when value "1" which represents the frame is selected for the pattern data to be recorded in data-base 9, the image data is read out. As a result, as the pattern data is scanned, only the image data of the frame is caused to correspond to pattern data "1" and is recorded together with the pattern data in data-base 9. Actually, the pattern data which specifies the frame is recorded as shown in FIG. 12A, and only the image data of the frame represented by pattern data "1" are sequentially recorded as shown in FIG. 12B. Thus, using the pattern data, an amount of image data to be recorded can be largely reduced.

The spectacles frame data thus recorded is reproduced and reconstructed to be an original image as follows. That is, data read out from data-base 9 is input to processor 7 and separated into pattern data and image data consisting of RGB signals. If the separated pattern data is "0", fixed image data "0" is selected. If the pattern data is "1", the separated image data consisting of the RGB signals are sequentially read out.

By this processing, an image of a spectacles frame is reconstructed by an image of the frame represented by pattern data "1" and an image of a background other than the frame represented by pattern data "0". The resultant frame image is transferred to image memory 3 and displayed on TV monitor 5.

When data of only half of a spectacles frame is recorded, the reproduced and reconstructed half spectacles frame image is folded back to form an image of the other half. One spectacles frame image is formed by synthesizing these two images and stored in image memory 3.

FIG. 9B is a flow chart for a sequence of processing for reproducing such a spectacles frame image.

In FIG. 9B, frame pattern data and frame image data recorded in data-base 9 are separated by separating circuit 28 (step C1). Then, the frame pattern data is stored in memory 26, and the frame image data is stored in memory 29, respectively. In step C2, the frame image is reconstructed in accordance with the pattern data stored in memory 26. That is, if the pattern data is "0", selecting circuit 30 selects image data "0". If the pattern data is "1", the frame image data stored in memory 29 are sequentially read out. If the pattern data is "2", color image data which is externally input from, e.g., microcomputer 8 is selected. In step C3, these image data are stored in RAM 21.

As described above, cutout, recording, and reproducing of a frame image are performed.

Registration of spectacles frame image data performed by the system according to the present invention will be described below.

The system has a working menu as shown in FIG. 13A, and a processing function is selected by a menu.

As shown in FIG. 13B, a utility menu includes (1. INITIALIZE FDD), (2. DISPLAY REGISTER NUMBER), and (3. DISPLAY FRAME). In a (1. INITIALIZE FDD) mode, an FDD (Floppy Disk Drive) for recording spectacles frame data is initialized. In a (2. DISPLAY REGISTER NUMBER) mode, a list of frame numbers assigned to spectacles frames recorded in the FDD is displayed as shown is FIG. 13C. By this frame number list, frame numbers already registered can be confirmed, and registrable frame numbers can be found. Note that registered frame numbers are sorted in an order of, e.g., their numbers and displayed. In a (DISPLAY FRAME) mode, by designating a frame number, an image of a spectacles frame assigned with the frame number is displayed as shown in FIG. 13D, thereby confirming a frame.

These are basic utility functions prepared for the present system.

Recording of spectacles frame data as described above is started by a REGISTER FRAME menu. In order to select the REGISTER FRAME menu, cursor 10b displayed as a horizontal line as shown in FIG. 2 is displayed on TV monitor 5, thereby maintaining horizontality. After the horizontality is thus assured, rectangular cursor 10a for specifying an image processing region is displayed on TV monitor 5.

Note that positioning for cutting out only half of a spectacles frame may be performed by image processing. However, in this embodiment, positioning is performed manually by observing an image displayed on the TV monitor.

When an image of half of the spectacles frame is obtained in a rectangular region as described above, processor 7 is activated to obtain data of the spectacles frame and set and record a register number corresponding to the frame.

A CHANGE FRAME NUMBER menu is prepared to change a frame number of a spectacles frame which is already set and input. This menu is displayed as shown in FIG. 13E. According to this menu a frame number of a spectacles frame to be changed and a new frame number to be set are input, and then a frame image (not shown) corresponding to the frame number is displayed. After the frame number is confirmed by an operator, the frame number is changed.

A DELETE FRAME menu is prepared to delete registered spectacles frame data. According to this menu, a frame number of a spectacles frame to be deleted is input as shown in FIG. 13F, and a frame image which is specified by the number is displayed. After the frame number is confirmed by an operator, the frame number is deleted.

As shown in FIG. 13G, an editing menu of frame includes (1. BACK UP), (2. COPY), (3. CONTINUOUS COPY), and (4. COPY WITH FRAME NUMBER CHANGED).

In a (1. BACK UP) mode, all the frame data recorded in the FDD are transferred to another FDD. In a (2. COPY) mode, one of spectacles frame data recorded in the FDD is specified by a frame number, and frame data specified by the frame number is transferred to another FDD. In a (3. CONTINUOUS COPY) mode, a plurality of spectacles frame data recorded in the FDD are sequentially specified, and these spectacles frame data are sequentially transferred to another FDD. In a (4. COPY WITH FRAME NUMBER CHANGED) mode, a frame number of a spectacles frame to be transferred to another FDD and recorded therein is changed, and then transfer processing is performed.

By the above edit frame functions, registered spectacles frame data are arranged.

FIG. 14 shows an arrangement of a key pad for selecting a menu.

(Edge Processing of Synthesized Image)

Figures 15, 16:
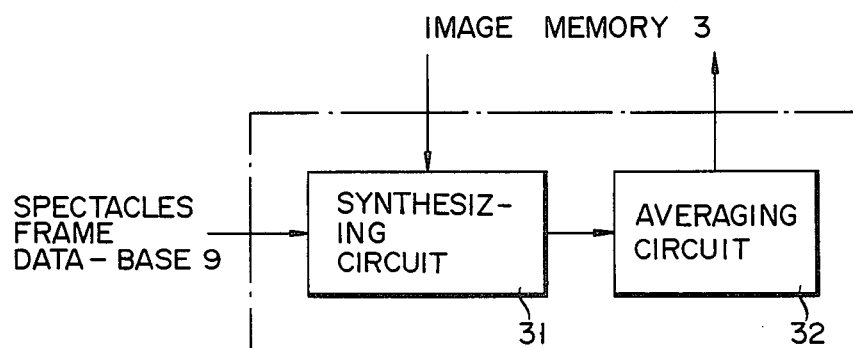
FIG. 15 is a view for averaging processing at a boundary of a synthetic image.
FIG. 16 is a block diagram of an arrangement of a circuit which performs the averaging processing at the boundary of the synthetic image.

Assume that a spectacles frame image is selectively synthesized with an image of a face, which is picked up and input by a TV camera, of a person who wants to select a spectacles frame. In this case, if colors or brightnesses of images largely differ from each other due to a difference between illumination conditions during photographing, jaggy is produced at a boundary of a synthesized image. One of reasons for this is that image data is processed as an NTSC signal. That is, in accordance with characteristics of the NTSC signal a frequency of R-Y and B-Y signals becomes ¼ that of bright signal Y. Therefore, one color is normally stored in image memory 3 with respect to four pixels, i.e., image data obtained by averaging color components of four pixels is stored therein. When this image data is displayed, color data is given in units of four pixels which continue in a scanning direction as shown in FIG. 15. Note that as for bright component Y, color data is given in a unit of one pixel.

That is, in region 33A having four pixels as one unit as shown in FIG. 15, three out of four pixels are "0"s which represent a background. Therefore, color data of the background is given in region 33A. In region 33B, since four pixels are all "1"s which represent a frame, color data of the frame is given. In region 33C, contrary to region 33A, three out of four pixels are "1"s. Therefore, data of the frame is given in region 33C. When such image data is displayed, its boundary appears as a thick line in FIG. 15. For this reason, the boundary of the synthesized image is formed with jaggy which is produced in units of four pixels. Therefore, image processing for removing such jaggy must be provided.

Figure 17:
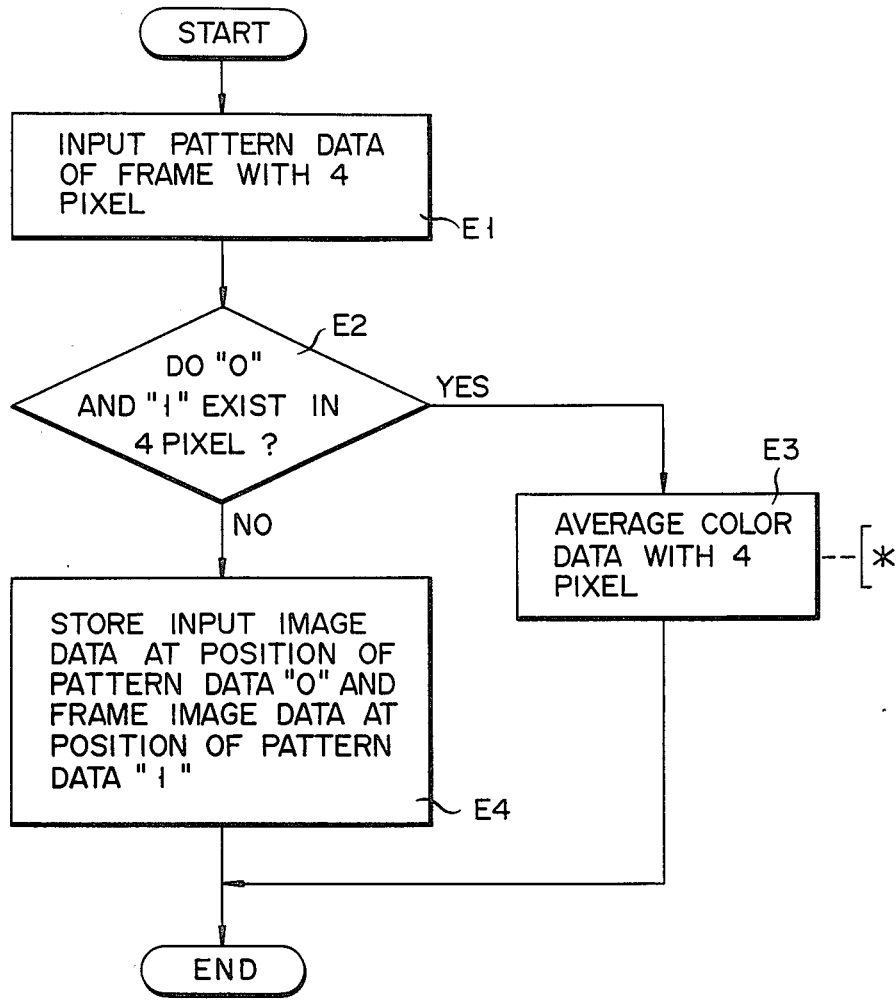
FIG. 17 is a flow chart for the averaging processing at the boundary of the synthetic image.

FIG. 16 is a block diagram of an arrangement of a circuit for synthesizing frame images which are sequentially read out from data-base 9 and an input image of a human face, and FIG. 17 is a flow chart for an operation of processing for averaging of a synthesizing image.

Synthesizing circuit 31 synthesizes frame images which are sequentially read out from data-base 9 and an input image of a human face from image memory 3.

In step E1, pattern data of a spectacles frame is input to averaging circuit 32. Then, whether both pattern data "0" and "1" exist in a region with a unit of four pixels is checked (step E2).

If both pattern data "0" and "1" exist in the region in step E2, color data with four pixels is averaged (step E3). That is, as described above, if the pattern data is "0", the image data of a human face stored in image memory 3 is read out as background image data X, and if the pattern data is "1", image data Y of the frame is read out from data-base 9. In this case, unlike in a conventional system, not data of one of colors but color data Z obtained by the following equation is used for a synthesizing image:

$$Z = (n/4)X + (1 - n/4)Y \qquad (2)$$

where n is the number of pixels of pattern data "0" in a region with four pixels.

In step E2, if four pixels of the pattern data are all "0"s, the background image data is stored in image memory 3, and if four pixels of the pattern data are all "1"s, the frame image data is stored therein.

By the above processing, jaggness at the boundary of the synthesized image can be removed.

(Color Mixing Processing of Synthesizing image)

Conventionally, a spectacles frame is selected by actually wearing a desired frame among a plurality of spectacles frames. However, since lenses are not mounted on a frame, it is difficult for a person who requires spectacles to confirm whether the frame fits his or her face. When color lenses are to be selected, it is difficult to cut a variety of lenses as needed during frame selection in terms of economy. Therefore, a method for easily selecting a spectacles frame which fits a user's face well must be available.

Figures 18A, 18B:
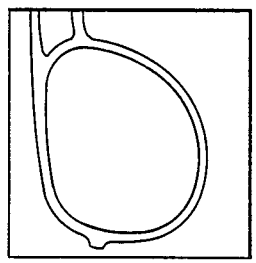
FIGS. 18A and 18B are views of frame image data and its pattern data to be recorded in a spectacles frame data-base, respectively.

For example, in image data of a half of a spectacles frame cut out in symmetry of a frame as shown in FIG. 18A, pattern data in which labeling is performed such that "1" is selected for a frame, "2" is selected for a lens, and "0" is selected for a background, and an image data of the frame are recorded in data-base 9 as shown in FIG. 18B.

Such spectacles frame data is selectively read out from data-base 9 in accordance with a frame number by microcomputer 8, and the remaining half of the spectacles frame image is reproduced on the basis of symmetry, a complete spectacles frame image is obtained.

Figure 19:
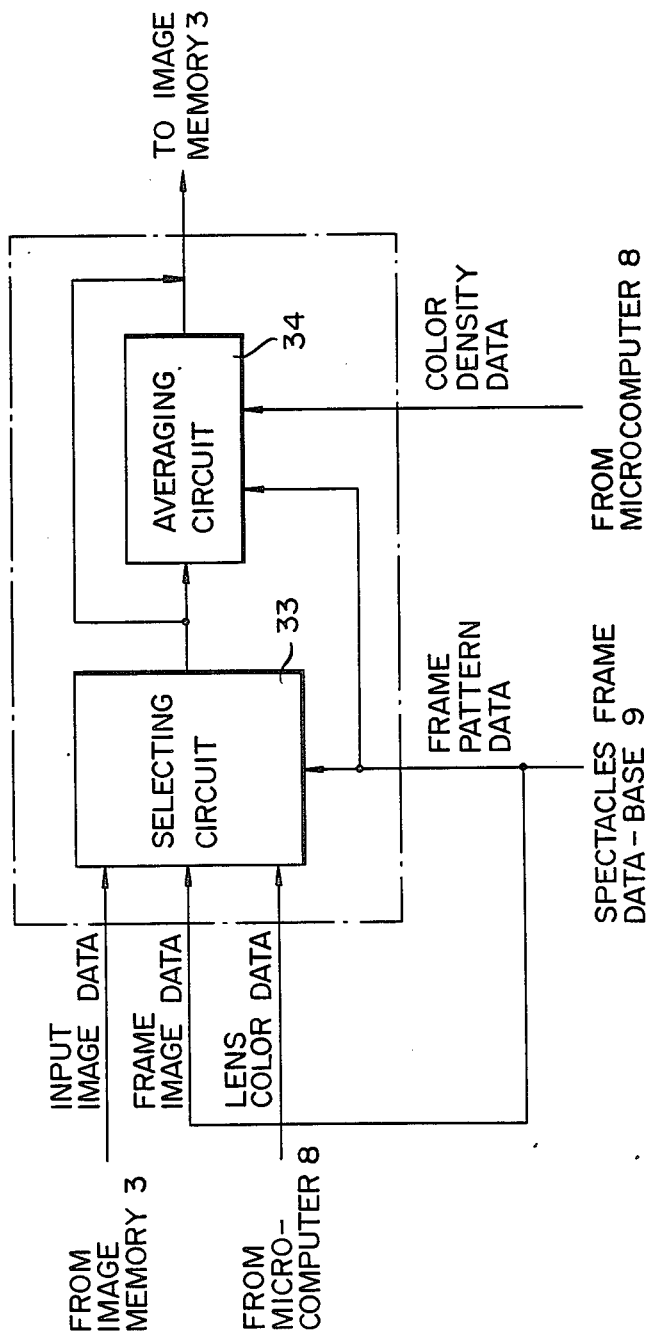
FIG. 19 is a block diagram of an arrangement of a circuit which performs mixing processing of colors between images to be synthesized.

FIG. 19 is a block diagram of an arrangement of a processing circuit for synthesizing a spectacles frame image and a human face image and mixing colors, and FIG. 20 is a flow chart for an operation of processing.

In step F1, pattern data PDATA is read out from data-base 9, and whether PDATA is "0" is examined (step F2). If PDATA is "0" in step F2, input image data of a human face from image memory 3 is selected (step F3) and input to selecting circuit 33.

If PDATA is not "0" in step, F2, whether PDATA is "1" is examined (step F4). If PDATA is "1" in step F4, frame image data read out from data-base 9 is selected (step F5) and input to selecting circuit 33.

If PDATA is not "1" in step F4, lens color data set by microcomputer 8 and the input image data of a human face are selected and input to selecting circuit 33. In this case, averaging circuit 34 mixes the lens color data and the input image data of a human face in accordance with color density data set by microcomputer 8 (step F6).

According to this mixing processing, if transmittivity of the color lens is 35%, 65% of the face image data and 35% of the color data are mixed. By this mixing processing, the face image data at the lens is colored in accordance with a brightness corresponding to the transmittivity. Thus, a synthesized image consisting of the face, frame, and lens image data is obtained and displayed on the TV monitor.

Figure 21B:
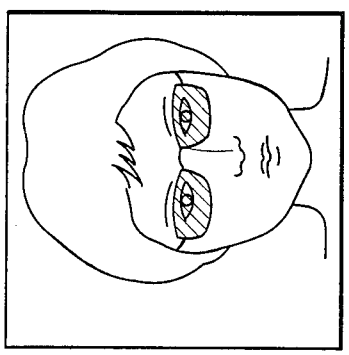
FIGS. 21A and 21B are views for an operation of synthesizing an image of a human face and a spectacles frame image.
Figure 21A:
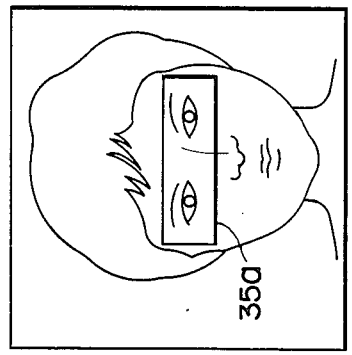

For example, when a synthesizing position of a frame is determined by cursor 35a on an image of a human face picked up and input by TV camera 1, and a lens color is arranged as shown in FIG. 21A, a selected frame image and colored lenses are synthesized with the human face image and displayed.

Therefore, the user can easily determine whether the selected spectacles frame and the lens color fit his or her face in accordance with a synthesized image.

According to the system of the present invention, coloring of a lens, its density or transmittivity, and a region to be colored can be arbitrarily set in accordance with predetermined color. That is, several colors are selected with respect to the lens, and a predetermined transmittivity is given to the respective colors. Note that in order to represent a colorless lens, "0" is given as color data.

Figure 22:
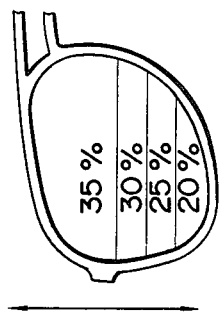
FIG. 22 is a view for a method of coloring a lens.

A color region of the lens is set such that, e.g., an upper half of the lens is colored and a lower half thereof becomes colorless step by step. For example, by changing pattern data of the lens below the boundary from "2" to "3", the face image data at the lens represented by pattern data "3" is mixed with the color data as shown in FIG. 22.

Figure 24A:
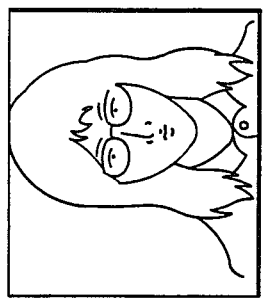
FIGS. 24A to 24C are views of a case wherein a single spectacles frame is selected and a direction face is varied.
Figure 24B:
Figure 24C:
Figure 23A:
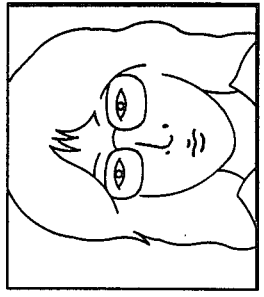
FIGS. 23A to 23C are views of a case wherein a plurality of spectacles frame are selected.
Figure 23B:
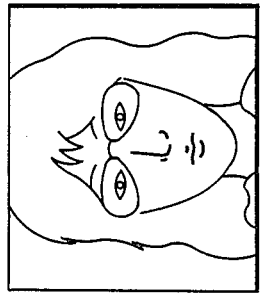
Figure 23C:
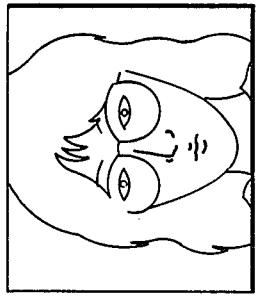

According to the present system, several frame images can be stored in image memory 3 and compares with each other. More specifically, when a plurality of spectacles frames are selected as shown in FIGS. 23A to 23C, face images synthesized with frame images can be compared with each other. When a single frame is selected as shown in FIGS. 24A to 24C, a person who wants to select a spectacles frame actually wears the frame. Then, front, right, and left images of his or her face are picked up and displayed, thereby this selection of the frame is confirmed.

Note that the present invention is not limited to the above embodiment but can be variously modified without departing from the spirit and scope of the invention.

What is claimed is:

1. A method for spectacles frame image processing and recording comprising the steps of:
   acquiring at least one subject image including a spectacles frame and a background;
   storing the acquired subject image;
   displaying the stored subject image;
   setting an image cutout region including a half of the spectacles frame on the displayed subject image;
   cutting out a half image representing the half of the spectacles frame within the image cutout region;
   extracting image data at a central portion of the half image as background image data;
   obtaining pattern data of the half image in accordance with the extracted image data, and obtaining the image data of the spectacles frame from the half image in accordance with the pattern data; and
   recording the pattern data and the image data of the spectacles frame.

2. A method according to claim 1, wherein an enhancement region existing near an edge of the spectacles frame in the subject image is removed by detecting a portion representing image values having a polarity opposite to image values of the spectacles frame on the basis of a background image value.

3. A method according to claim 1, wherein the obtained step includes the step of digitized-processing the half image using a predetermined threshold value.

4. A method according to claim 3, wherein the digitized-processing step includes the step of changing the predetermined threshold value by the number of lacking pixels in the image data of the spectacles frame during obtaining of the pattern data.

5. A method according to claim 4, wherein a frame distinguishing function value H as an index of the spectacles frame in the digitized-processing step is obtained by:

$$H = |R-r| + |G-g| + |B-b|$$

where R, G, and B are three color image signals of red, green and blue in the spectacles frame, and r, g, and b are three color image signals of red, green and blue in the background.

6. A method according to claim 1, wherein the recording step includes the step of reproducing the image data of the spectacles frame using the pattern data.

7. A method according to claim 1, further comprising the steps of:
   acquiring face image data of a person;
   selecting one of the spectacles frames and reading out the recorded image data corresponding to the selected spectacles frame;
   synthesizing the read out image data and the acquired face image data, thereby obtaining a synthesized image representing a face of the person taken on the spectacles frame; and
   displaying the synthesized image.

8. A method according to claim 7, wherein color data Z of a region having four pixels as a unit in the synthesized image is obtained by:

$$Z = (n/4)X + (1 - n/4)Y$$

where n is the number of pixels of pattern data corresponding to the background, X is the background image data, and Y is the image data of the spectacles frame.

9. A method according to claim 8, wherein jagginess produced at a boundary of the synthesized image is removed using the color data.

10. A method according to claim 8, wherein the color data of a lens of the spectacles frame in the synthesized image is set by a microcomputer.

11. A method according to claim 10, wherein a mixing ratio between the color data of the lens and the face image data in the synthesized image is determined by a transmittivity of the lens set by the microcomputer.

12. A system for spectacles frame image processing and recording comprising:
   acquiring means for acquiring a subject image including a spectacles frame and a background;
   storing means for storing the subject image acquired by the acquiring means;

displaying means for displaying the subject image stored in the storing means;

setting means for setting an image cutout region including a half of the spectacles frame on the subject image displayed on the displaying means;

cutting out means for cutting out a half image representing the half of the spectacles frame within the image cutout region set by the setting means;

extracting means for extracting image data at a central portion of the half image as background image data;

obtaining means for obtaining pattern data of the half image in accordance with the image data extracted by the extracting means, and obtaining image data of the spectacles frame from the half image in accordance with the pattern data; and recording means for recording the pattern data and the image data of the spectacles frame.

13. A system according to claim 12, wherein an enhancement region existing near an edge of the spectacles frame in the subject image is removed by the obtaining means including means for detecting a portion representing image values having a polarity opposite to image values of the spectacles frame on the basis of a background image value.

14. A system according to claim 12, wherein the obtaining means includes digitizing means for digitizing the half image using a predetermined threshold value.

15. A system according to claim 14, wherein the digitizing means includes changing means for changing the predetermined threshold value by the number of lacking pixels in the image data of the spectacles frame during obtaining of the pattern data.

16. A system according to claim 15, wherein a frame distinguishing function value H as an index of the spectacles frame utilized in the digitizing means is obtained by:

$$H = |R-r| + |G-g| + |B-b|$$

where R, B, and B are three color image signals of red, green and blue in the spectacles frame, and r, g, and b are three color image signal of red, green and blue in the background.

17. A system according to claim 12, wherein the recording means includes reproducing means for reproducing the image data of the spectacles frame using the pattern data.

18. A system according to claim 12, further comprising:

selecting means for selecting one of the spectacles frames, thereby reading out the image data corresponding to the selected spectacles frame from the recording means; and synthesizing means for synthesizing the image data of the spectacles frame selected by the selecting means and face image data acquired by the acquiring means, thereby obtaining synthesized image representing a face of a person taken on the spectacles frame.

19. A system according to claim 18, wherein color data Z of a region having four pixels as a unit in the synthesized image provided by the synthesizing means is obtained:

$$Z = (n/4)X + (1 - n/4)Y$$

where n is the number of pixels of pattern data corresponding to the background, X is the background image data, and Y is the image data of the spectacles frame.

20. A system according to claim 19, wherein jagginess produced at a boundary of the synthesized image provided by the synthesizing means is removed using the color data.

21. A system according to claim 19, wherein the color data of the lens of the spectacles frame is set in the synthesizing means.

22. A system according to claim 21, wherein a mixing ratio between the color data of the lens and the face image data in the synthesized image is determined by a transmittivity of the lens set in the synthesizing means.

* * * * *